United States Patent [19]

Beistle

[11] 3,745,602

[45] July 17, 1973

[54] WEB CLEANING APPARATUS HAVING A MOVABLE BLADE

[75] Inventor: Rex G. Beistle, Longmont, Colo.

[73] Assignee: International Business Machines Corporation, Armonk, N.Y.

[22] Filed: Feb. 14, 1972

[21] Appl. No.: 226,162

[52] U.S. Cl. .................... 15/308, 15/93 R, 15/256.5

[51] Int. Cl. .......... B08b 5/04, A47l 5/38, A47l 5/14

[58] Field of Search ................ 15/93 R, 100, 256.5, 15/303, 306 A, 308, 401

[56] References Cited

UNITED STATES PATENTS

| | | | |
|---|---|---|---|
| 1,933,084 | 10/1933 | Allison | 15/100 |
| 2,739,338 | 3/1956 | Weeks | 15/100 X |
| 3,072,951 | 1/1963 | Kelnhofer | 15/401 X |
| 3,195,164 | 7/1965 | Gysling | 15/308 |
| 3,274,636 | 9/1966 | MacGregor | 15/306 A |
| 3,475,782 | 11/1969 | Teuber | 15/308 |
| 3,602,940 | 9/1971 | Barbeau et al. | 15/308 |
| 3,683,445 | 8/1972 | Hagadorn | 15/308 |

*Primary Examiner*—Wayne A. Morse, Jr.
*Assistant Examiner*—C. K. Moore
*Attorney*—Francis A. Sirr et al.

[57] ABSTRACT

A magnetic tape unit having a movable-blade tape cleaner forming part of the tape processing station. The movable blade extends into the tape path and is bidirectionally movable, as a result of tape movement. Two operate blade positions are determined by two stops. In each of the operate positions a cleaning edge is presented to the moving tape. The direction of movement of the movable blade to an operative position is controlled by the direction of tape movement.

17 Claims, 4 Drawing Figures

WEB CLEANING APPARATUS HAVING A MOVABLE BLADE

BACKGROUND AND SUMMARY OF THE INVENTION

This invention relates to the field of brushing, scrubbing and general cleaning, with means to guide or move the work to or through a cleaning station.

More specifically, this invention relates to a magnetic tape cleaner wherein the tape is passed through a tape processing station, the oxide surface of the tape being scraped or abraded by an edged instrument to smooth and clean the oxide surface prior to the tape passing in transducing relation to a magnetic transducer or head.

The prior art contains numerous teachings relative to the cleaning of magnetic tape, and to magnetic tape transports having magnetic tape cleaners disposed in the tape path. For example, the tape may be passed in continuous contact with a pair of arcuate openings or a pair of arcuate knife edges which are associated with a vacuum chamber to carry away the material removed from the tape.

Other prior art provides a tape cleaner wherein a cylindrical tape guide is mounted for limited rotation, such that tape movement rotates the guide in one direction or the other, depending upon the direction of tape movement. A series of tape cleaning slits are formed in the surface of the guide and are arranged so that these slits are moved into engagement to clean the tape for only one direction of tape movement.

Another form of magnetic tape cleaner comprises a cylindrical tube having a plurality of slots therein, such that the edges of the slots form cutting edges for cleaning the tape. The cylindrical tube is preferably driven counter to movement of the tape.

Yet another form of tape cleaner positions a vacuum actuated tape scraper on each side of a raad/write head. Each of these scrapers includes a housing having a hollow interior and an open bottom including a knife edge which is normally out of engagement with the tape. Each of the housings is connected to a vacuum source and vacuum force is selectively applied to that housing which is upstream of the head, to thereby pull the moving tape into engagement with a knife edge before the tape encounters the head.

The present invention provides an improved apparatus for use in cleaning the surface of a movable web, for example the oxide recording surface of magnetic tape, by means of a movable cleaning member which extends into the web path is adapted to be driven to a first or a second operative position by web movement, in accordance with the direction of web movement. The cleaning member is constructed and arranged such that when the member is in the first or the second operative position, a first or a second cleaning surface, respectively, is presented to the surface to be cleaned.

More specifically, but without limitation thereto, the movable cleaning member takes the form of a movable wall which separates two cavities. The two cavities are connected to a source of subatmospheric or vacuum pressure. Thus, the movable wall forms a valve-like member to induce air flow over the operative cleaning surface and the surface being cleaned and into one of the cavities, for either direction of web movement. As yet a further feature of the present invention, the movable wall takes the form of a swinging or pivoted blade having a broad, for example arcuate, surface extending into the web path, the broad surface terminating in a first and a second cleaning edge or knife. In addition, each cavity may include relatively soft stop means in the form of a resilient pad which engages the inoperative cleaing edge to limit movement of the blade, while at the same time cleaning the inoperative cleaning edge by dislodging material therefrom. The pivoted blade may include a number of openings, or opening means, interconnecting the two cavities. This opening means induces air flow into that cavity associated with the inoperative cleaning edge for either direction of web movement.

The foregoing and other features and advantages of the invention will be apparent from the following more particular description of the preferred embodiment of the invention, as illustrated in the accompanying drawing.

DESCRIPTION OF THE PREFERRED EMBODIMENT

Figure 1:
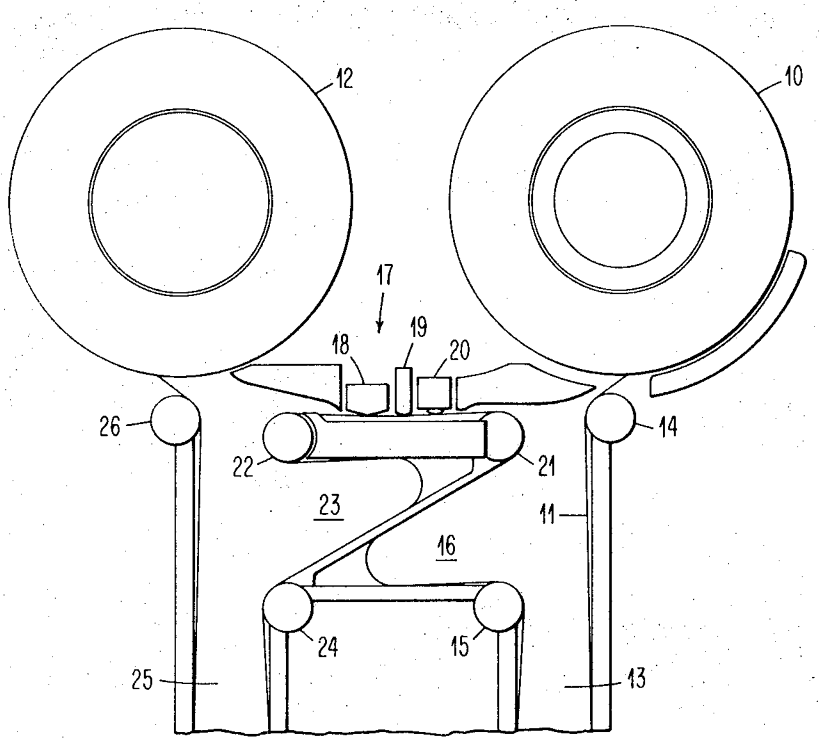
FIG. 1 is a diagrammatic showing of a magnetic tape unit utilizing the cleaning apparatus of the present invention and showing the means for establishing a tape path.

The web cleaning apparatus of the present invention finds utility with web transports having a variety of structural configurations. One of these configurations is shown in FIG. 1 wherein a single capstan moves magnetic tape between vacuum column buffering mechanism, and tape loop sensing means within the vacuum columns controls supply and take-up reels of magnetic tape. Describing this tape transport briefly, reference numeral 10 identifies a removable supply or file reel of one-half inch magnetic tape. Tape 11, in traveling through the tape path to take-up or machine reel 12, first passes over air bearing 14 and enters vacuum column 13. As the tape leaves vacuum column 13 it travels over a further air bearing 15 into a tapered vacuum column 16. Thereafter, the tape enters a tape processing station identified generally by reference numeral 17. This tape processing station comprises guide means and the like establishing a tape path such that the tape passes in contact with the web cleaning apparatus 20 of the present invention, an erase transducer 19 and a magnetic transducer 18 having a read and a write section. The tape is supported at the ends of the tape path by an air bearing 21 and a bidirectionally rotatable capstan 22. The forward direction of tape movement is the right to left movement of the tape, achieved by counterclockwise rotation of the capstan.

After the tape leaves the capstan, it enters a second tapered vacuum column 23, leaving this vacuum column at air bearing 24 and entering vacuum column 25. The tape is supported by air bearing 26 as it leaves column 25 and enters the machine reel.

The tape on reel 10 is oriented with its recording oxide surface faced inwardly such that the portion of the tape extending between air bearing 21 and capstan 22 has its oxide surface in engagement with transducers 18 and 19 and web cleaning apparatus 20.

The tape path established by the structural means above described insures that a slight "wrap" or "wrap-angle" of tape is produced about an operational surface of read/write transducer 18, as is well known by those of ordinary skill in the art. As will be described, cleaning apparatus 20 of the present invention is uniquely constructed to insure that the tape wrap-angle is the same for both directions of tape movement.

In the transport disclosed in FIG. 1, the web cleaning apparatus 20 of the present invention is arranged to clean the tape prior to the tape encountering the read/write transducer for forward direction of the tape. For backward direction of the tape, the cleaning apparatus 20 cleans the tape downstream of the read/write transducer. FIG. 1 discloses but one operational environment for the web cleaning apparatus of the present invention. The present invention is not to be limited to this exemplary operating environment. For example, it may be desirable to position a web cleaning apparatus of the present invention to the left of the read/write transducer, or to position a web cleaning apparatus on each side of the transducer.

Figure 2:
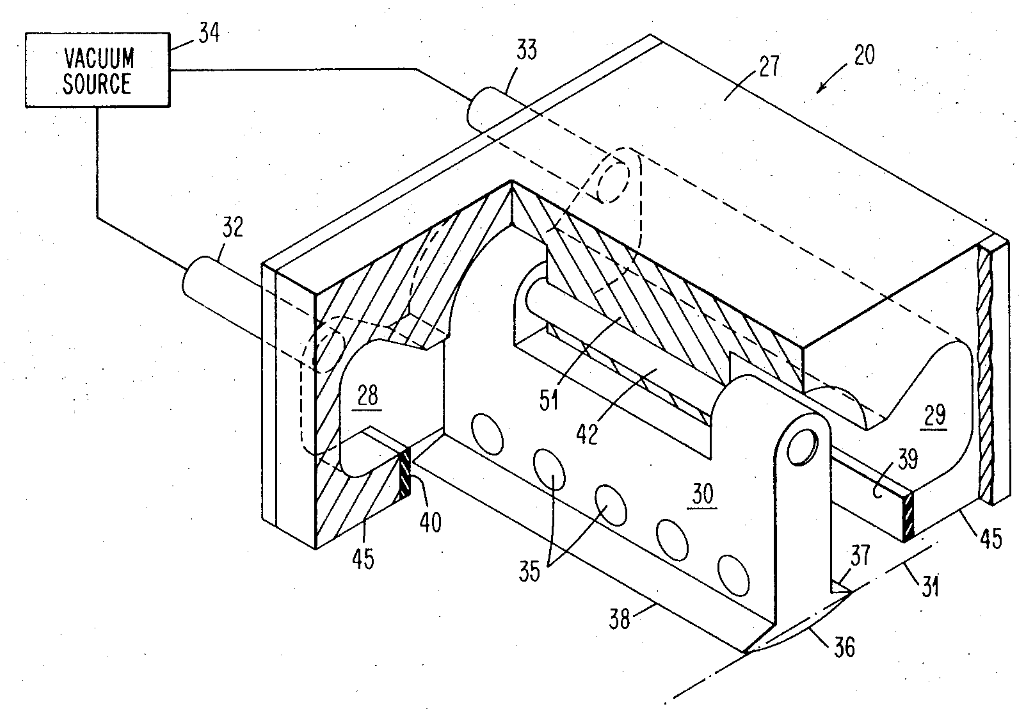
FIG. 2 is an enlarged perspective view of the cleaning apparatus, partially in section, with the front wall of the housing cut away to expose the two cavities and the pivoted blade which separates the two cavities, and further showing the two resilient pads which constitute the stop means for the blade.

Referring to FIG. 2, this figure is an enlarged view of cleaning apparatus 20, partially in section, with the front wall of its housing 27 broken away to expose two cavities 28 and 29 and pivoted blade 30. Cavities 28 and 29 extend between the front and back walls of the housing and are of a width slightly greater than the width of the tape, for example one-eighth inch greater. Blade 30 comprises a movable wall-like member which is mounted on the housing and extends into the tape path 31 established by the structural arrangement disclosed in FIG. 1. Each of the cavities 28 and 29 includes a conduit 32 and 33, respectively, adapted to be connected to a source of subatmospheric pressure or vacuum, diagrammatically represented by vacuum source means 34. Pivoted blade 30 forms a movable wall separating cavities 28 and 29. This blade carries opening means in the form of a plurality of openings 35. These openings connect the cavities one to the other. Blade 30 terminates at a relatively broad and preferably arcuate surface 36 carrying spaced first and second cleaning surfaces 37 and 38 in the form of cleaning edges or cleaning knives.

Housing 27 carries stop means 39 and 40. These stop means are preferably softer than cleaning surfaces 37 and 38 and may take the form of continuous resilient rubber-like pads which extend through the housing between the front and back walls thereof. The stop means functions to limit and control the pivotal movement of blade 30. This pivotal movement is controlled to be the amount of movement which is necessary to bring one or the other of the cleaning edges 37, 38 into operative cleaning relation with the tape's oxide surface.

Housing 27 includes a protruding boss 51 which receives a pivot pin 42. This pivot pin pivotally couples blade 30 to the housing. Arcuate surface 36, as shown in FIG. 2, is of a length approximately equal to the distance between the front and back walls of the housing, this being slightly greater than the width of the tape.

Figure 3:
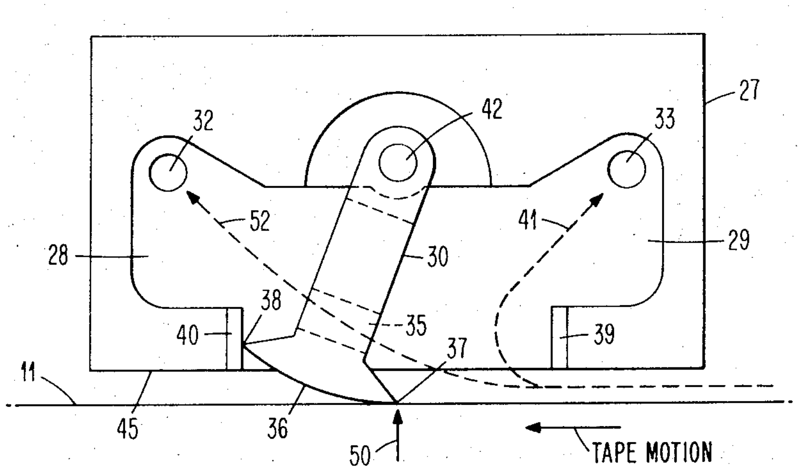
FIGS. 3 and 4 are front views of the apparatus of FIG. 2, showing the operative cleaning position of the blade for forward and reverse tape travel, respectively.
Figure 4:
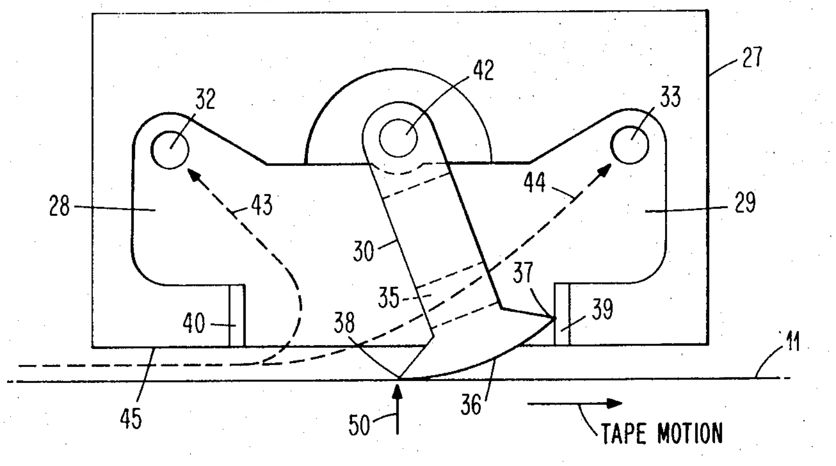

FIGS. 3 and 4, respectively, show the two operative cleaning positions of blade 30, FIG. 3 being the position assumed by the blade for forward movement of tape 11 and FIG. 4 being the operative blade position for backward movement of tape 11. In either case, the engagement between arcuate surface 36 and tape 11, the movement of the tape, has driven the blade to a stop position wherein one of its cleaning edges is moved to an inoperative position into engagement with a fixed stop carried by the housing, and the other cleaning edge is moved into operative cleaning engagement with the oxide surface of the tape.

As tape 11 moves in a forward direction, right to left, blade 30 moves or pivots to the left by virtue of friction drive through surface 36. As cavity 28 begins to close, the force exerted on blade 30 by vacuum source 34 aids this movement of the blade. This movement of the blade continues until cleaning surface 38 strikes resilient pad 40, resulting in the position shown in FIG. 3. At this position, cleaning surface 37 is properly oriented to the upper oxide surface of tape 11 and the tape is cleaned as it moves in the forward direction. Furthermore, since movable blade 30 is of a width approxiately equal to the width of the tape, it functions as a valving member, opening cavity 29 and closing cavity 28. As a result of this valving action, primary air flow, represented by arrow 41, sweeps over the portion of the tape being cleaned and over cleaning surface 37, removing material cleaned from the tape's surface by way of conduit 33. Secondary air flow is indicated by arrow 52. This air flow is through the blade's opening means 35 into the closed cavity 28. This secondary air flow functions not only to additionally remove material from the interface of operative cleaning surface 37 and the tape, but also functions to remove material which is dislodged from the inoperative cleaning surface 38 when this cleaning surface engages resilient pad 40.

In FIG. 4 the blade is shown in the operative position for backward, left to right, movement of tape 11. In this position, cleaning surface 38 is operative and cleaning surface 37 is inoperative. Cleaning surface 37 functions with stop pad 39 to control the position of blade 30. In this position, the blade has valved cavities 28 and 29 to open cavity 28 and to close cavity 29. The above-described primary air flow is represented by arrow 43 and the secondary air flow is represented by arrow 44.

A unique feature of the present invention is apparent from FIGS. 4 and 5; namely, cleaning surfaces 37 and 38 occupy the same geometric tape path position when in their respective operative positions. This is accomplished by controlling the positions of stops 39 and 40, controlling the spacing of cleaning surfaces 37 and 38 along the direction of tape motion, and controlling the radius about which cleaning surfaces 37 and 38 rotate. More specifically, the inoperative cleaning surface strikes its stop when the operative cleaning surface has moved to be coincident with the nominal tape path position, that is, the approximate position the tape seeks in the absence of cleaning apparatus 20. Additionally, cleaning surfaces 37 and 38 occupy the same point in the tape path, identified by reference numeral 50 in FIGS. 3 and 4, when surfaces 37 and 38, respectively, are in the operative positions of FIGS. 3 and 4.

With reference to FIG. 2, it will be noted that the flat bottom surface 45 of housing 27 is spaced from tape path 31, for example a distance of one-fourth inch. As a result of this spacing, as can be more clearly seen in FIGS. 3 and 4, an air-flow channel is provided to allow essentially laminar air to flow between surface 45 of the housing and tape 11, this air flow being in the direction of tape motion for either direction of tape movement.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for use in cleaning the surface of a bidirectionally movable web, comprising:

means establishing a web path, a movable cleaning member mounted to cooperate with the web's surface and extending into said web path, and first and second spaced cleaning surfaces carried by said cleaning member and spaced from each other along said web path, said cleaning member being movable by virtue of web movement to present one or the other of said cleaning surfaces to the web's surface in accordance with the direction of tape movement.

2. The apparatus defined in claim 1 wherein said movable cleaning member is a pivoted member having a broad surface extending into said web path, said broad surface including said first and second spaced cleaning surfaces.

3. The apparatus defined in claim 2 including stop means cooperating with said pivoted member and functioning to limit pivotal movement of said cleaning member to the amount necessary to bring one or the other of said cleaning surfaces into operative cleaning relation to the web's surface, the operative one of said cleaning surfaces occupying the same given position for each direction of web movement.

4. The apparatus defined in claim 3 wherein said stop means cooperates with the inoperative one of said cleaning surfaces.

5. Apparatus for use in cleaning the surface of bidirectionally movable magnetic tape, comprising:

means establishing a tape path, a housing disposed adjacent said tape path and the tape's surface, and a movable wall-like member movably mounted on said housing and extending into said tape path, said member having first and second tape cleaning edges spaced from each other along said tape path, said wall-like member being movable by virtue of the tape movement to present one or the other of said cleaning edges to the tape's surface in accordance with the direction of tape movement.

6. Apparatus as defined in claim 5 wherein said housing includes first and second cavities spaced from each other along said tape path, said cavities having said wall-like member as a common movable wall, a source of subatmospheric pressure connected to each of said cavities, said wall-like member functioning to open the cavity associated with the operative cleaning edge and thereby induce air flow over the operative cleaning edge to remove material cleaned from the tape.

7. Apparatus as defined in claim 6 wherein said wall-like member includes opening means connecting said first and second cavities, to thereby additionally induce air flow over the operative cleaning edge and into the closed cavity associated with the inoperative cleaning edge.

8. Apparatus as defined in claim 6 wherein said movable wall-like member is pivotally connected to said housing intermediate said cavities and includes a broad surface extending into said tape path, said broad surface including said spaced cleaning edges and engaging said tape to cause said wall-like member to be pivoted as a result of tape movement to present both a cleaning edge and cleaning air flow to the advancing surface of the tape for either direction of tape movement.

9. Apparatus as defined in claim 8 wherein each of said cavities includes stop means cooperating with the inoperative cleaning edge to limit pivotal movement of said wall-like member, and wherein the operative cleaning edge occupies the same given position relative to said tape path for each direction of tape movement.

10. Apparatus as defined in claim 9 wherein said stop means is adapted to clean said inoperative cleaning edge.

11. Apparatus as defined in claim 10 wherein said housing includes a surface facing said tape path, and wherein housing is mounted to space said surface from said tape path to provide a flow path for cleaning air into said cavities in the direction of tape travel.

12. Apparatus as defined in claim 5 wherein said movable wall-like member is of a width approximately equal to the width of the tape.

13. Apparatus as defined in claim 12 wherein said housing includes first and second cavities spaced from each other along said tape path, said cavities having a width approximately equal to the width of the tape and having said wall-like member as a common movable wall.

14. Apparatus as defined in claim 13 including a source of subatmospheric pressure connected to each of said cavities, and a continuous stop formed as a portion of each cavity and adapted to be engaged by an inoperative one of said cleaning edges to thereby close the cavity associated with said inoperative cleaing edge.

15. Apparatus as defined in claim 14 wherein each of said stops in a continuous resilient pad having width approximately equal to the width of the tape.

16. A magnetic tape transport including means for cleaning the recording surface of bidirectionally movable magnetic tape, comprising:

means establishing a tape path, magnetic transducing means mounted adjacent said tape path to produce a wrap of tape at an operational surface of said transducing means for either direction of tape movement, a housing mounted adjacent said transducing means, a movable member mounted on said housing and extending into said tape path, said member having first and second tape cleaning edges spaced from each other along said tape path, said movable member being movable in the direction of tape movement by virtue of engagement with the tape to present one or the other of said cleaning edges to the advancing recording surface in accordance with the direction of tape movement, and means constructed and arranged to control the movement of said movable member such that each of said two cleaning edges, when in cleaning position, occupies an identical position in said tape path.

17. A magnetic tape transport as defined in claim 16 wherein said movable member is a wall-like member pivotally mounted on said housing, wherein said housing includes first and second cavities spaced from each other along said tape path, said cavities having said wall-like member as a common movable wall, a source of subatmospheric pressure connected to each of said cavities, said wall-like member functioning to open the cavity associated with the operative cleaning edge and thereby induce air flow over the operative cleaning edge to remove material cleaned from the advancing recording surface, and wherein said last named means includes stop means constructed and arranged to limit pivotal movement of said wall-like member to cause the operable one of said cleaning edges to occupy said identical position in said tape path for each direction of tape movement.

* * * * *